United States Patent
Pfeil

(10) Patent No.: US 10,273,186 B2
(45) Date of Patent: Apr. 30, 2019

(54) REACTIVE RESIN COMPOSITION AND USE OF THE SAME

(71) Applicant: Hilti Aktiengesellschaft, Schaan (LI)

(72) Inventor: Armin Pfeil, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 45 days.

(21) Appl. No.: 15/535,551

(22) PCT Filed: Dec. 18, 2015

(86) PCT No.: PCT/EP2015/080447
§ 371 (c)(1),
(2) Date: Jun. 13, 2017

(87) PCT Pub. No.: WO2016/097269
PCT Pub. Date: Jun. 23, 2016

(65) Prior Publication Data
US 2017/0369373 A1    Dec. 28, 2017

(30) Foreign Application Priority Data
Dec. 19, 2014   (EP) .................................... 14199157

(51) Int. Cl.
| | | |
|---|---|---|
| *C08F 4/50* | (2006.01) | |
| *B01J 27/32* | (2006.01) | |
| *C04B 26/06* | (2006.01) | |
| *C08F 4/10* | (2006.01) | |
| *C08F 4/40* | (2006.01) | |
| *C08G 18/67* | (2006.01) | |
| *C08G 18/76* | (2006.01) | |
| *C04B 26/16* | (2006.01) | |
| *C04B 26/18* | (2006.01) | |
| *C04B 14/06* | (2006.01) | |
| *C04B 24/26* | (2006.01) | |
| *C09J 4/06* | (2006.01) | |
| *C04B 111/00* | (2006.01) | |
| *C04B 103/00* | (2006.01) | |

(52) U.S. Cl.
CPC ............ *C04B 26/06* (2013.01); *C04B 14/066* (2013.01); *C04B 24/2641* (2013.01); *C04B 26/16* (2013.01); *C04B 26/18* (2013.01); *C08F 4/10* (2013.01); *C08F 4/40* (2013.01); *C08F 4/50* (2013.01); *C08G 18/672* (2013.01); *C08G 18/7664* (2013.01); *C04B 2103/0016* (2013.01); *C04B 2111/00715* (2013.01); *C08F 2438/01* (2013.01); *C09J 4/06* (2013.01)

(58) Field of Classification Search
CPC .......... C08F 4/50; C08F 4/54; C08F 4/60089; C08F 2438/01; C08F 2/38; B01J 27/32; B01J 27/02; B01J 2531/16
See application file for complete search history.

(56) References Cited

U.S. PATENT DOCUMENTS

| | | | | |
|---|---|---|---|---|
| 6,541,580 | B1 * | 4/2003 | Matyjaszewski | ......... C08F 2/38 526/113 |
| 2004/0260051 | A1 * | 12/2004 | Muhlebach | ............. C07C 69/63 528/271 |
| 2011/0281999 | A1 * | 11/2011 | Kautz | ....................... C08F 2/38 524/547 |
| 2014/0221573 | A1 * | 8/2014 | Schall | ..................... C08F 20/10 525/222 |
| 2016/0152754 | A1 * | 6/2016 | Pfeil | .................... C08K 5/3435 524/99 |

FOREIGN PATENT DOCUMENTS

| | | |
|---|---|---|
| EP | 2 824 155 A1 | 1/2015 |
| JP | 2007-527463 | 9/2007 |
| JP | 2007-254758 | 10/2007 |
| JP | 2010-126563 A | 6/2010 |
| JP | 2012-508312 | 4/2012 |

OTHER PUBLICATIONS

Yamago, et al., "Living Radical Polymerization 1. Polymerization Mechanism and Methods 1," Japan Rubber Association Magazine, 2009, 82, 3, pp. 135-140, with English-language abstract.

* cited by examiner

*Primary Examiner* — Rip A Lee
(74) *Attorney, Agent, or Firm* — Grüneberg & Myers PLLC

(57) ABSTRACT

A reactive resin composition is described, with a resin component, which contains a radical-polymerizable compound, and an initiator system, which contains an α-halocarboxylic acid and a catalyst system, which comprises a nitrogen-containing ligand and Cu(0) or an inorganic Cu(I) compound, as is the use of the same for construction purposes.

20 Claims, No Drawings

REACTIVE RESIN COMPOSITION AND USE OF THE SAME

The invention relates to a radical-curable reactive resin composition with a resin ingredient and an initiator system, which comprises an initiator and a catalyst system, which is capable of forming a transition metal complex in situ as catalyst, as well as the use of the composition for construction purposes, especially for anchoring of anchoring elements in drilled holes.

The use of reactive resin compositions on the basis of unsaturated polyester resins, vinyl ester resins or epoxy resins as bonding and adhesive agents has long been known. These are two-component systems, wherein one component contains the resin mixture and the other component the curing agent. Other common ingredients such as fillers, accelerators, stabilizers and solvents, including reactive solvents (reactive diluents), may be present in the one and/or the other component. When the two components are mixed, the reaction is initiated with formation of a cured product.

The mortar masses to be used in the chemical fastening technique are complex systems, upon which special requirements are imposed, such as, for example, the viscosity of the mortar mass, the curing and full hardening in a relatively broad temperature range, usually −10° C. to +40° C., the inherent strength of the cured mass, adhesion to different substrates and environmental conditions, load values, creep strength and the like.

In principle, two systems are used in the chemical fastening technique. One is based on radical-polymerizable, ethylenically unsaturated compounds, which are usually cured with peroxides, and one based on epoxy amines.

Organic, curable two-component reactive resin compositions on the basis of curable epoxy resins and amine hardeners are used as adhesives, grouting masses for filling cracks and, among other purposes, for fastening of construction elements, such as anchor rods, concrete iron (rebar), bolts and the like, in drilled holes. Such mortar masses are known, for example, from EP 1 475 412 A2, DE 198 32 669 A1 and DE 10 2004 008 464 A1.

One disadvantage of the known epoxy-based mortar masses lies in the use of often considerable quantities of corrosive amines as hardeners, such as xylylene diamine (XDA), especially m-xylylene diamine (mDXA; 1,3-benzenedimethanamine), and/or of aromatic alcohol compounds, such as free phenols, e.g. bisphenol A, which may mean a health risk for the user. These compounds are present sometimes in quite considerable proportions, i.e. up to 50% in the respective components of multicomponent mortar masses, and so frequently an obligation to label the packaging exists, leading to poor acceptance of the product by the users. In recent years, some countries have introduced limit values, up to which the content of mXDA or bisphenol A, for example, in the product is still permissible or must then be labeled, or is still permissible at all in products.

Radical-curable systems, especially systems curable at room temperature, need so-called radical starters, also known as initiators, so that the radical polymerization can be started. In the field of chemical fastening technology, the hardener composition described in German Application DE 3226602 A1, comprising benzoyl peroxide as radical starter and an amine compound as accelerator, and the hardener composition described in European Application EP 1586569 A1, comprising a perester as hardener and a metal compound as accelerator, have become widely used by virtue of their properties. These hardener compositions permit rapid and quite complete curing even at very low temperatures down to −30° C. Furthermore, these systems are sufficiently robust in terms of the mixing ratio of resin and hardener. Thus they are suitable for use under construction-site conditions.

A disadvantage of these hardener compositions, however, is that in both cases peroxides must be used as radical starters. These are heat-sensitive, and they react very sensitively to impurities. This leads to considerable restrictions in the formulation of pasty hardener components, especially for grouting mortar, with respect to storage temperatures, storage stability and the choice of suitable components. In order to permit the use of peroxides, such as dibenzoyl peroxide, peresters and the like, phlegmatizing agent such as phthalates or water are added to stabilize them. These act as plasticizers and thus significantly impair the mechanical strength of the resin mixtures.

Furthermore, these known hardener compositions are disadvantageous inasmuch as they must contain considerable peroxide proportions, which is problematic, because in some countries peroxide-containing products must be labeled as sensitizing at a concentration of 1% or greater, for example for dibenzoyl peroxide. Similar requirements also exist for the amine accelerators, which in some cases are also subject to the labeling obligation.

Heretofore only few attempts have been made to develop peroxide-free systems on the basis of radical-polymerizable compounds. DE 10 2011 078 785 A1 discloses a peroxide-free hardener composition for radical-polymerizable compounds that contains a 1,3-dicarbonyl compound as hardener and a manganese compound as accelerator as well as the use thereof for reactive resin compositions on the basis of radical-curable compounds. Under certain conditions, however, this system tends not to achieve sufficient full hardening, which may lead to reduced performance capability of the cured mass, especially for application as a dowel mass, with the result that an application for dowel masses is indeed generally possible here, but not for such applications in which relatively high load values are reliably required.

In the two described systems, it is further disadvantageous that in each case a well-defined ratio of resin component and hardener component (also abbreviated as mixing ratio hereinafter) must be present, so that the binding agent is able to cure completely and the required properties of the cured masses can be achieved. Many of the known systems are not very robust, which concerns the mixing ratio, and they sometimes react relatively sensitively to mixing fluctuations, which impacts the properties of the cured masses.

Another option for initiating radical polymerization without the use of peroxides is provided by the ATRP method (=Atom Transfer Radical Polymerization), which is frequently used in macromolecular synthesis chemistry. It is assumed that this involves a "living" radical polymerization, albeit without imposing a restriction due to the description of the mechanism. In this method, a transition metal compound is reacted with a compound that contains a transferable group of atoms. In the process, the transferable group of atoms is transferred to the transition metal compound, whereby the metal is oxidized. A radical that adds onto ethylenically unsaturated groups is formed in this reaction. However, the transfer of the group of atoms to the transition metal compound is reversible, and so the group of atoms is transferred back to the growing polymer chain, whereby a controlled polymerization system is formed. This reaction mechanism is described, for example, by J. S. Wang, et al., J. Am. Chem. Soc., vol. 117, p. 5614-5615 (1995) and by Matyjaszewski, Macromolecules, vol. 28, p. 7901-7910 (1995). Furthermore, the publications WO 96/30421 A1, WO 97/47661 A1, WO 97/18247 A1, WO 98/40415 A1 and WO 99/10387 A1 disclose variants of the ATRP explained in the foregoing.

ATRP has long been of scientific interest, and it is used mainly to control the properties of polymers selectively and to adapt them to the desired applications. This includes control of the particle size, structure, length and weight as well as weight distribution of polymers. Accordingly, the structure of the polymer as well as the molecular weight and molecular weight distribution can be controlled. As a result, ATRP is also increasingly attracting scientific interest. For example, U.S. Pat. Nos. 5,807,937 and 5,763,548 describe (co)polymers that were manufactured by means of ATRP and are useful for a large number of applications, such as dispersing agents and surface-active substances.

Heretofore, however, the ATRP method has not been used to perform a polymerization in situ, for example on the construction site under the conditions prevailing there, as is necessary for application, in construction, of mortar, bonding and dowel masses, for example. The requirements imposed on the polymerizable compositions during these applications, namely initiation of polymerization in the temperature range between −10° C. and +60° C., inorganically filled compositions, adjustment of a gel time followed by polymerization of the resin ingredient as rapidly and completely as possible, packaging as one-component or multicomponent systems and the other known requirements applicable to the cured mass, have not yet been taken into consideration in the extensive literature about ATRP.

The object of the invention is therefore to provide, for mortar systems of the type described in the introduction, a reactive resin composition that does not suffer from the cited disadvantages of the known systems, that can be packaged in particular as a two-component system, is stable during storage over months and can be cured reliably, i.e. is cold-curing, at the application temperatures that are common for reactive resin mortars, i.e. between −10° C. and +60° C., especially between −5° C. and +40° C.

The inventor has surprisingly found that the object can be solved by using, for the reactive resin compositions described above on the basis of radical-polymerizable compounds, an initiator system on the basis of a halocarboxylic acid ester as radical initiator with Cu(0) or inorganic Cu(I) compounds, together with a nitrogen-containing ligand as the catalyst system.

For better understanding of the invention, the following explanations of the terminology used herein are regarded as practical first of all. Within the context of the invention:

"cold-curing" means that the polymerization, also referred to synonymously as "curing" herein, of the curable compounds can be started at room temperature without additional energy input, such as by supplying heat, by the curing agents contained in the reactive resin compositions, if applicable in the presence of accelerators, and can also exhibit full hardening sufficient for the planned application purposes.

"separated in a way that inhibits reaction" means that separation between compounds or components is achieved in such a way that a mutual reaction is possible only when the compounds or components are brought into contact with one another, for example by mixing; reaction-inhibiting separation is also conceivable by (micro)encapsulation of one or more compounds or components;

"curing agents" means substances that bring about polymerization (curing) of the basic resin;

"aliphatic compound" means an acyclic and cyclic, saturated or unsaturated hydrocarbon compound that is not aromatic (PAC, 1995, 67, 1307; Glossary of class names of organic compounds and reactivity intermediates based on structure (IUPAC Recommendations 1995));

"accelerator" means a compound that is capable of accelerating the polymerization reaction (curing) and that is used to accelerate formation of the radical starter;

"polymerization inhibitor", also referred to synonymously as "inhibitor" herein, means a compound that is capable of inhibiting the polymerization reaction (curing) and that is used to prevent the polymerization reaction and thus an undesired premature polymerization of the radical-polymerizable compound during storage (often referred to as stabilizer) and that is used to delay the start of the polymerization reaction immediately after addition of the curing agent; in order to achieve the purpose of stability during storage, the inhibitor is usually used in such low proportions that the start of the polymerization is not influenced; in order to influence the moment of the start of the polymerization reaction, the inhibitor is usually used in proportions such that the gel time is influenced;

"reactive diluent" means liquid or low-viscosity monomers and basic resins that dilute other basic resins or the resin ingredient and thus impart the viscosity necessary for application thereof; they contain functional groups capable of reacting with the basic resin and, during polymerization (curing), a major part thereof becomes an ingredient of the cured mass (mortar).

"gel time" for unsaturated polyester or vinyl ester resins, which are normally cured with peroxides means the duration of the phase of curing of the resin, in which the temperature of the resin rises from +25° C. to +35° C.; this corresponds approximately to the time interval in which the fluidity or viscosity of the resin is still in a range in which the reactive resin or the reactive resin mass can still be easily processed or worked;

"two-component system" means a system that comprises two components stored separately from one another, generally a resin and a hardener component, so that curing of the resin component take place only after mixing of the two components;

"multicomponent system" means a system that comprises three or more components stored separately from one another, so that curing of the resin component takes place only after mixing of all components;

"(meth)acryl . . . / . . . (meth)acryl" means that both "methacryl . . . / . . . methacryl" and "acryl . . . / . . . acryl" compounds are supposed to be included.

The inventor has found that, under the reaction conditions prevailing for construction applications, radical-polymerizable compounds can be polymerized with a combination of certain compounds, such as are used for initiation of ATRP. Thus it is possible to provide a reactive resin composition that is free of peroxides, that is cold-curing, that fulfills the requirements imposed on reactive resin compositions for use as mortar, bonding or dowel masses and that in particular is packaged so as to be stable in storage, especially as a two-component or multicomponent system.

Surprisingly, it has been found that, during use of a catalyst system comprising at least one nitrogen-containing ligand and Cu(0) or an inorganic Cu(I) compound, polymerization of a radical-curable resin can be initiated in the absence of a reducing agent.

A first subject matter of the invention is therefore a reactive resin composition with a resin component, which contains a radical-polymerizable compound, and an initiator system, which contains an α-halocarboxylic acid ester and a catalyst system, wherein the catalyst system comprises at least one nitrogen-containing ligand and Cu(0) or an inorganic Cu(I) compound.

In this way it is possible to provide reactive resin compositions that are free of peroxides and critical amine compounds and thus are no longer subject to the labeling obligations. Furthermore, the compositions no longer contain any phlegmatizing agents functioning as plasticizers in the cured mass. A further advantage of the invention is that the composition, when packaged as a two-component system, permits any desired proportion of the two components relative to one another, in which case the initiator and if applicable the accelerator are present in a form dissolved homogeneously in the components and the Cu(0) or the inorganic Cu(I) compound is present in homogeneously dispersed form, so that only a low concentration thereof is also necessary.

According to the invention, the initiator system comprises an initiator and a catalyst system.

The initiator is expediently a compound having a halogen-carbon bond, which by catalyzed homolytic cleavage yields C radicals, which are able to start a radical polymerization. To ensure that the radical is sufficiently long-lived, the initiator must contain substituents capable of stabilizing the radical, such as carbonyl substituents, for example. The halogen atom exerts a further influence on the initiation.

The primary radical formed from the initiator preferably has a structure similar to that of the radical center of the growing polymer chain. Thus, when the reactive resin compositions comprise methacrylate resins or acrylate resins, α-halocarboxylic acid esters of isobutanoic acid or of propanoic acid are particularly suitable. In the individual case, however, the particular suitability should always be determined by experiments.

For application of the reactive resin composition as a constructional bonding, mortar or dowel mass, especially for mineral substrates, one class of compounds has proved particularly suitable. Thus, according to the invention, the initiator is an α-halocarboxylic acid ester of the general formula (I)

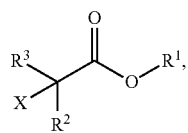

(I)

in which
X denotes chlorine, bromine or iodine, preferably chlorine or bromine, particularly preferably bromine;
$R^1$ stands for a straight-chain or branched $C_1$-$C_{20}$ alkyl group, substituted if necessary, preferably $C_1$-$C_{10}$ alkyl group, or an aryl group; or
for the radical of an acylated, branched, trihydric alcohol, the radical of a completely or partly acylated, linear or branched tetrahydric alcohol, the radical of a completely or partly acylated, linear pentahydric or hexahydric alcohol, the radical or a completely or partly acylated, linear or cyclic $C_4$-$C_6$ aldose or $C_4$-$C_6$ ketose or the radical of a completely or partly acylated disaccharide, and isomers of these compounds.
$R^2$ and $R^3$, independently of one another, stand for hydrogen, a $C_1$-$C_{20}$ alkyl group, preferably $C_1$-$C_{10}$ alkyl group and more preferably $C_1$-$C_6$ alkyl group, or a $C_3$-$C_8$ cycloalkyl group, $C_2$-$C_{20}$ alkenyl or alkynyl group, preferably $C_2$-$C_6$ alkenyl group or alkynyl group, oxiranyl group, glycidyl group, aryl group, heterocyclyl group, aralkyl group or aralkenyl group (aryl-substituted alkenyl groups).

Such compounds as well as the manufacture thereof are known to the person skilled in the art. In this regard, reference is made to the publications WO 06/30421 A1 and WO 00/43344 A1, the contents of which are included in the present Application.

Suitable initiators comprise, for example, $C_1$-$C_6$ alkyl esters of an α-halo-$C_1$-$C_6$ carboxylic acid, such as α-chloropropionic acid, α-bromopropionic acid, α-chloroisobutanoic acid, α-bromoisobutanoic acid and the like.

Esters of α-bromoisobutanoic acid are preferred. Examples of suitable α-bromoisobutanoic acid esters are: bis[2-(2'-bromoisobutyryloxy)ethyl] disulfide, bis[2-(2-bromoisobutyryloxy)undecyl] disulfide, α-bromoisobutyryl bromide, 2-(2-bromoisobutyryloxy)ethyl methacrylate, tert-butyl α-bromoisobutyrate, 3-butynyl 2-bromoisobutyrate, dipentaerythritol hexakis(2-bromo-isobutyrate), dodecyl-2 bromoisobutyrate, ethyl α-bromoisobutyrate, ethylene bis (2-bromoisobutyrate), 2-hydroxyethyl 2-bromoisobutyrate, methyl α-bromoisobutyrate, octadecyl 2-bromoisobutyrate, pentaerythritol tetrakis(2-bromoisobutyrate), poly(ethyleneglycol) bis(2-bromoisobutyrate), poly(ethyleneglycol) methyl ether 2-bromoisobutyrate, 1,1,1-tris(2-bromoisobutyryloxymethyl)ethane, 10-undecenyl 2-bromoisobutyrate.

According to the invention, the catalyst system consists of at least one nitrogen-containing ligand and Cu(0) or an inorganic Cu(I) compound.

The ligand expediently contributes to activation of the copper salt in the radical-polymerizable compound to be used, since the Cu(0) or the inorganic Cu(I) compound itself is not soluble.

To ensure that radicals that initiate the polymerization of the radical-polymerizable compounds can be split off from the initiator, a compound is required that permits or controls or in particular accelerates cleavage. With a suitable compound it is possible to provide a reactive resin mixture that cures at room temperature.

Expediently, this compound is a suitable transition metal complex, which is capable of homolytically cleaving the bond between the α-carbon atom and the halogen atom of the initiator attached thereto. Furthermore, the transition metal complex must be capable of participating in a reversible redox cycle with the initiator, a dormant polymer chain end, a growing polymer chain end or a mixture thereof.

According to the invention, this compound is prepared from elemental copper (Cu(0)) or an inorganic Cu(I) compound and a nitrogen-containing ligand.

The elemental copper (Cu(0)) may be used in one or more physical forms. For example, the elemental copper may be used as filament, as wire, as netting, as plate, as chips, as powder, as fine fabric (gauze), as sinter, as filter, as ribbon, as tube, as pellets, as crystals, as coating on non-copper-containing and thus non-reactive materials or in another solid form. In order to have adequately high reactivity, the specific surface area of the elemental copper should be sufficiently large, in which case the reactivity also depends on the physical form in which the copper is used. The surface may be machined appropriately by known methods, in order to achieve the necessary reactivity.

Suitable inorganic Cu(I) compounds are, for example, Cu(I) compounds of the elements of Group VI of the Periodic Table, $Cu_2X$, where X=O, S, Se or Te, in which case the following order is obtained for the reactivity with respect to the gel time of the composition: $Cu_2Te>Cu_2Se>Cu_2O>Cu_2S$. Thus it is possible to select a Cu(I) compound that is suitable with respect to the desired gel time to be adjusted.

Suitable ligands, especially neutral ligands, are known from the chemistry of transition metal complexes. They are coordinated with the centers of coordination via various bond types, e.g. σ-, π-, μ-, η-bonds. The reactivity of the copper(I) complex relative to the initiator can be adjusted by the choice of ligand.

According to the invention, the ligand is a nitrogen-containing ligand. Expediently, the ligand is a nitrogen-containing ligand that contains one, two or more nitrogen atoms, such as monodentate, bidentate or tridentate ligands.

Suitable ligands are amino compounds with primary, secondary and/or tertiary amino groups, among which those with exclusively tertiary amino groups are preferred, or amino compounds with heterocyclic nitrogen atoms.

Examples of suitable amino compounds are: Ethylenediaminetetraacetate (EDTA), N,N-dimethyl-N',N'-bis(2-dimethylaminoethyl)ethylenediamine (Me6TREN), N,N'-dimethyl-1,2-phenyldiamine, 2-(methylamino)phenol, 3-(methylamino)-2-butanol, N,N'-bis(1,1-dimethylethyl)-1,2-ethanediamine or N,N,N',N'',N''-pentamethyldiethylenetriamine (PMDETA), and monodentate, bidentate or tridentate heterocyclic electron-donor ligands, such as those derived from unsubstituted or substituted heteroarenes, such as furan, thiophene, pyrrole, pyridine, bipyridine, picolylimine, γ-pyran, γ-thiopyran, phenanthroline, pyrimidine, bis-pyrimidine, pyrazine, indole, coumarin, thionaphthene, carbazoles, dibenzofuran, dibenzothiophene, pyrazole, imidazole, benzimidazole, oxazole, thiazole, bis-thiazole, isoxazole, isothiazole, quinoline, biquinoline, isoquinoline, biisoquinoline, acridine, chromane, phenazines, phenoxazines, phenothiazines, triazines, thianthrene, purine, bisimidazole and bisoxazole.

Among those, 2,2'-bipyridine, N-butyl-2-pyridylmethanimines, 4,4'-di-tert-butyl-2,2'-dipyridine, 4,4'-dimethyl-2,2'-dipyridine, 4,4'-dinonyl-2,2'-dipyridine, N-dodecyl-N-(2-pyridylmethylene)amine, 1,1,4,7,10,10-hexamethyltriethylene-tetramine, N-octadecyl-N-(2-pyridylmethylene)amine, N-octyl-2-pyridyl-methaneimine, N,N,N',N'-tetramethylethylenediamine, N,N,N',N'',N''-pentamethyl diethylenetriamines, 1,4,8,11-tetracyclotetradecane, N,N,N',N'-tetrakis(2-pyridylmethyl)ethylenediamine, 1,4,8,11-tetramethyl-1,4,8,11-tetra-azacyclotetradecane, tris[2-(diethylamino)ethyl]amine or tris(2-methylpyridyl)amine are preferred, wherein tris-(dimethylaminoethyl)amine (TDMAEA), 1,1,4,7,10,10-hexamethyltriethylenetetramine, N,N,N',N'',N''-pentamethyldiethyltriamine (PMDETA), 2,2'-bipyridine (bipy) or N,N,N',N'-tetramethylethylenediamine are preferred.

Without restricting the scope, further suitable amines are, for example: 1,2-diaminoethane(ethylenediamine), 1,2-propanediamine, 1,3-propanediamine, 1,4-diaminobutane, 2,2-dimethyl-1,3-propanediamine (neopentanediamine), diethylaminopropylamine (DEAPA), 2-methyl-1,5-diaminopentane, 1,3-diaminopentane, 2,2,4- or 2,4,4-trimethyl-1,6-diaminohexane and mixtures thereof (TMD), 1-amino-3-aminomethyl-3,5,5-trimethylcyclohexane (IPD), 1,3-bis(aminomethyl)-cyclohexane, 1,2-bis(aminomethyl) cyclohexane, hexamethylenediamine (HMD), 1,2- and 1,4-diaminocyclohexane (1,2-DACH and 1,4-DACH), bis(4-aminocyclohexyl)methane, bis(4-amino-3-methylcyclohexyl)-methane, diethylenetriamine (DETA), 4-azaheptane-1,7-diamine, 1,11-diamino-3,6,9-trioxaundecane, 1,8-diamino-3,6-dioxaoctane, 1,5-diamino-methyl-3-azapentane, 1,10-diamino-4,7-dioxadecane, bis(3-aminopropyl)amine, 1,13-diamino-4,7,10-trioxatridecane, 4-aminomethyl-1,8-diaminooctane, 2-butyl-2-ethyl-1,5-diaminopentane, N,N-bis-(3-aminopropyl)methylamine, triethylenetetramine (TETA), tetraethylenepentamine (TEPA), pentaethylenehexamine (PEHA), bis(4-amino-3-methylcyclohexyl)methane, 1,3-benzenedimethanamine (m-xylenediamine, mXDA), 1,4-benzenedimethanamine (p-xylenediamine, pXDA), 5-(aminomethyl)bicyclo[[2.2.1]hept-2-yl]methylamine (NBDA, norbornanediamine), dimethyldipropylenetriamine, dimethylaminopropylaminopropylamine, (DMAPAPA), 3-aminomethyl-3,5,5-trimethylcyclohexylamine (isophoronediamine (IPD)), diaminodicyclohexylmethane (PACM), mixed polycyclic amines (MPCA) (e.g. Ancamine® 2168), dimethyldiaminodicyclohexylmethane (Laromin® C260), 2,2-bis(4-aminocyclohexyl)propane, (3(4),8(9)bis(aminomethyl)dicyclo[5.2.1.0$^{2,6}$]decane (mixture of isomers, tricyclic primary amines; TCD-diamine), 2-methylpentanediamine (DYTEK A®), N-ethylaminopiperazine (N-EAP), 1,3-bisaminomethylcyclohexane (1,3-BAC), 1,14-diamino-4,11-dioxatetradecane, dipropylenetriamine, 2-methyl-1,5-pentanediamine, N,N'-dicyclohexyl-1,6-hexanediamine, N,N'-dimethyl-1,3-diaminopropane, N,N'-diethyl-1,3-diaminopropane, N,N-Dimethyl-1,3-diaminopropane, secondary polyoxypropylenedi- and triamines, 2,5-diamino-2,5-dimethylhexane, bis-(amino-methyl)tricyclopentadiene, 1,8-diamino-p-menthane, bis-(4-amino-3,5-dimethylcyclohexyl) methane, 1,3-bis(aminomethyl)cyclohexane (1,3-BAC), dipentylamine, N-2-(aminoethyl)piperazine (NAEP), N-3-(aminopropyl)piperazine, piperazine.

The amine may be used either alone or as a mixture of two or more thereof.

In a further embodiment, the reactive resin composition further contains an accelerator. Thereby the system is more reactive and the polymerization can be accelerated. Especially when Cu(0) is used as catalyst, a distinct improvement of the reactivity can be observed if an accelerator is added to the reactive resin composition. Furthermore, it has been found that the proportion of accelerator has a substantial influence on the reactivity, in which case small proportions of below 1 wt % are already sufficient to achieve distinct acceleration of the polymerization.

Suitable accelerators are phenol or phenol derivatives, such as 1,2-dihydroxybenzene (pyrocatechol), 1,3-dihydroxybenzene (resorcinol), 1,4-dihydroxybenzene (hydroquinone), 1,2,3-trihydroxybenzene (pyrogallol), 1,2,4-trihydroxybenzene (hydroxyhydroquinone), 1,3,5-trihydroxybenzene (phloroglucinol), methylhydroquinone and the like, wherein these phenolic base compounds may be substituted and/or condensed as desired, and may be used individually or in combination.

According to the invention, ethylenically unsaturated compounds, compounds with carbon-carbon triple bonds and thiol-yne/ene resins, as are known by the person skilled in the art, are suitable as radical-polymerizable compounds.

Among these compounds, the group of ethylenically unsaturated compounds that comprises styrene and derivatives thereof, (meth)acrylates, vinyl esters, unsaturated polyesters, vinyl ethers, allyl ethers, itaconates, dicyclopentadiene compounds and unsaturated fats is preferred, among which unsaturated polyester resins and vinyl ester resins are particularly suitable and are described, for example, in publications EP 1 935 860 A1, DE 195 31 649 A1, WO 02/051903 A1 and WO 10/108939 A1. In this context, vinyl ester resins are most preferred, due to their hydrolytic resistance and excellent mechanical properties.

Examples of suitable unsaturated polyesters that may be used in the inventive resin mixture are subdivided into the following categories, as were classified by M. Malik et al. in J. M. S.—Rev. Macromol. Chem. Phys., C40(2 and 3), p. 139-165 (2000):

(1) Ortho resins: these are based on phthalic acid anhydride, maleic acid anhydride or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol-A;

(2) Iso resins: these are manufactured from isophthalic acid, maleic acid anhydride or fumaric acid and glycols. These resins may contain higher proportions of reactive diluents than the ortho resins;

(3) Bisphenol-A fumarates: these are based on ethoxylated bisphenol A and fumaric acid;

(4) HET acid resin (hexachloro-endo-methylene-tetrahydrophthalic acid resins): are resins obtained from chlorine/bromine-containing anhydrides or phenols during the manufacture of unsaturated polyester resins.

Besides these resin classes, the so-called dicyclopentadiene resins (DCPD resins) can also be distinguished as unsaturated polyester resins. The class of DCPD resins is obtained either by modification of one of the above-mentioned resin types by Diels-Alder reaction with cyclopentadiene, or alternatively they are obtained by a first reaction of a dicarboxylic acid, e.g. maleic acid, with dicyclopentadienyl, and then by a second reaction, the usual preparation of an unsaturated polyester resin, wherein the latter is referred to as a DCPD maleate resin.

The unsaturated polyester resin preferably has a molecular weight Mn in the range of 500 to 10,000 daltons, more preferably in the range of 500 to 5000 and even more preferably in the range of 750 to 4000 (according to ISO 13885-1). The unsaturated polyester resin has an acid number in the range of 0 to 80 mg KOH/g resin, preferably in the range of 5 to 70 mg KOH/g resin (according to ISO 2114-2000). If a DCPD resin is used as the unsaturated polyester resin, the acid number preferably amounts to 0 to 50 mg KOH/g resin.

Within the meaning of the invention, vinyl ester resins are oligomers, prepolymers or polymers with at least one (meth)acrylate end group, so-called (meth)acrylate-functionalized resins, which also include urethane (meth)acrylate resins and epoxy (meth)acrylate resins.

Vinyl ester resins, which have unsaturated groups only in end position, are obtained, for example, by reacting epoxy oligomers or polymers (e.g. bisphenol A diglycidyl ether, epoxides of the phenol novolac type or epoxy oligomers based on tetrabromobisphenol A) with, for example, (meth)acrylic acid or (meth)acrylamide. Preferred vinyl ester resins are (meth)acrylate-functionalized resins as well as resins obtained by reacting an epoxy oligomer or polymer with methacrylic acid or methacrylamide, preferably with methacrylic acid. Examples of such compounds are known from the publications U.S. Pat. Nos. 3,297,745 A, 3,772,404 A, 4,618,658 A, GB2217722A1, DE3744390A1 and DE41 31 457 A1.

Particularly suitable and preferred as vinyl ester resin are (meth)acrylate-functionalized resins, which are obtained by reacting difunctional and/or multifunctional isocyanates with suitable acrylic compounds, if necessary with associated action of hydroxy compounds that contain at least two hydroxyl groups, such as are described, for example, in DE 3940309 A1.

Aliphatic (cyclic or linear) and/or aromatic difunctional or multifunctional isocyanates or prepolymers thereof may be used as isocyanates. The use of such compounds serves to increase the wettability and thus to improve the adhesion properties. Aromatic difunctional or multifunctional isocyanates or prepolymers thereof are preferred, and aromatic difunctional or multifunctional prepolymers are particularly preferred. For example, toluylene diisocyanate (TDI), diisocyanatodiphenylmethane (MDI) and polymeric diisocyanatodiphenylmethane (pMDI) may be used to increase chain stiffness, while hexane diisocyanate (HDI) and isophorone diisocyanate (IPDI) may be used to improve flexibility, among which polymeric diisocyanatodiphenylmethane (pMDI) is quite particularly preferred.

Acrylic acid and acrylic acids substituted in the hydrocarbon radical, such as methacrylic acid, hydroxyl-group-containing esters of acrylic and methacrylic acid with multihydric alcohols, pentaerythritol tri(meth)acrylate, glycerol di(meth)acrylate, such as trimethylolpropane di(meth)acrylate and neopentyl glycol mono(meth)acrylate are suitable as acryl compounds. Acrylic and methacrylic acid hydroxyalkyl esters, such as hydroxyethyl (meth)acrylate, hydroxypropyl (meth)acrylate, polyoxyethylene (meth)acrylate and polyoxypropylene (meth)acrylate, are preferred, since such compounds contribute to steric hindrance of the saponification reaction.

Dihydric or multihydric alcohols, for example daughter products of ethylene or propylene oxide, such as ethanediol, di- or triethylene glycol, propanediol, dipropylene glycol, other diols, such as 1,4-butanediol, 1,6-hexanediol, neopentyl glycol, diethanolamine, further bisphenol A or F or ethoxylation/propoxylation and/or hydrogenation or halogenation products thereof, multihydric alcohols, such as glycerol, trimethylolpropane, hexanetriol and pentaerythritol, hydroxyl-group-containing polyethers, for example oligomers of aliphatic or aromatic oxiranes and/or of higher cyclic ethers, such as ethylene oxide, propylene oxide, styrene oxide and furan, polyethers that contain aromatic structural units in the main chain, such as those of bisphenol A or F, hydroxyl-group-containing polyesters based on the above-mentioned alcohols or polyethers and dicarboxylic acids or their anhydrides, such as adipic acid, phthalic acid, tetra- or hexahydrophthalic acid, hexachloro-endo-methylene-tetrahydrophthalic acid, maleic acid, fumaric acid, itaconic acid, sebacic acid and the like are suitable as potentially usable hydroxy compounds. Particularly preferred are hydroxy compounds with aromatic structure units for stiffening the chain of the resin, hydroxy compounds that contain unsaturated structure units, such as fumaric acid to increase the cross-linking density, branched or star-shaped hydroxy compounds, especially trihydric or multihydric alcohols and/or polyethers or polyesters that contain structure units thereof, and branched or star-shaped urethane (meth)acrylates to achieve lower viscosity of the resins or solutions thereof in reactive diluents as well as higher reactivity and cross-linking density.

The vinyl ester resin preferably has a molecular weight Mn in the range of 500 to 3000 daltons, more preferably 500 to 1500 daltons (according to ISO 13885-1). The vinyl ester resin has an acid number in the range of 0 to 50 mg KOH/g resin, preferably in the range of 0 to 30 mg KOH/g resin (according to ISO 2114-2000).

All of these resins, which may be used according to the invention, may be modified by methods known to the person skilled in the art, in order, for example, to obtain lower acid numbers, hydroxide numbers or anhydride numbers, or may be made more flexible by introduction of flexible units in the basic structure, and the like.

Furthermore, the resin may also contain other reactive groups capable of being polymerized with the inventive initiator system, for example reactive groups derived from itaconic acid, citraconic acid and allyl groups and the like.

In a preferred embodiment of the invention, the reactive resin composition contains further low-viscosity, radical-polymerizable compounds as reactive diluents for the radical-polymerizable compound, in order to adapt the viscosity thereof, if necessary.

Suitable reactive diluents are described in the publications EP 1 935 860 A1 and DE 195 31 649 A1. Preferably the resin mixture contains a (meth)acrylic acid ester as reactive diluent, wherein (meth)acrylic acid esters are selected particularly preferably from the group consisting of hydroxypropyl (meth)acrylate, propanediol-1,3 di(meth)acrylate, butanediol-1,2 di(meth)acrylate, trimethylolpropane tri(meth)acrylate, 2-ethylhexyl (meth)acrylate, phenylethyl (meth)acrylate, tetrahydrofurfuryl (meth)acrylate, ethyltriglycol (meth)acrylate, N,N-dimethylaminoethyl (meth)acrylate, N,N-dimethylaminomethyl (meth)acrylate, butanediol-1,4 di(meth)acrylate, acetoacetoxyethyl (meth)acrylate, ethanediol-1,2 di(meth)acrylate, isobornyl (meth)acrylate, diethylene glycol di(meth)acrylate, methoxypolyethylene glycol mono(meth)acrylate, trimethylcyclohexyl (meth)acrylate, 2-hydroxyethyl (meth)acrylate, dicyclopentenyloxyethyl (meth)acrylate and/or tricyclopentadienyl di(meth)acrylate, bisphenol-A (meth)acrylate, novolac epoxy di(meth)acrylate, di-[(meth)acryloyl-maleoyl]-tricyclo-5.2.1.0.$^{2,6}$-decane, dicyclopentenyloxyethyl crotonate, 3-(meth)acryloyl-oxymethyl-tricylo-5.2.1.0.$^{2,6}$-decane, 3-(methyl)cyclopentadienyl (meth)acrylate, isobornyl (meth)acrylate and decalyl-2 (meth)acrylate.

In principle, other common radical-polymerizable compounds may also be used alone or mixed with the (meth) acrylic acid esters, e.g. styrene, α-methylstyrene, alkylated styrenes, such as tert-butylstyrene, divinylbenzene and allyl compounds.

In a further embodiment of the invention, the reactive resin composition further contains an inhibitor.

The stable radicals commonly used as inhibitors, for radical-polymerizable compounds, such as N-oxyl radicals, such as are known to the person skilled in the art, are suitable as inhibitors both for the storage stability of the radical-polymerizable compounds and thus also of the resin component and also for adjustment of the gel time. Phenolic inhibitors, such as are otherwise commonly used in radical-curable resin compositions, cannot be used here, since the inhibitors would react as reducing agents with the copper(I) salt, and this would have a detrimental effect on the storage stability and the gel time.

As N-oxyl radicals, it is possible to use those described in DE 199 56 509 A1. Suitable stable N-oxyl radicals (nitroxyl radicals) may be selected from among 1-oxyl-2,2,6,6-tetramethylpiperidine, 1-oxyl-2,2,6,6-tetramethylpiperidine-4-ol (also known as TEMPOL), 1-oxyl-2,2,6,6-tetramethylpiperidine-4-one (also known as TEMPON), 1-oxyl-2,2,6,6-tetramethyl-4-carboxyl-piperidine (also known as 4-carboxy TEMPO), 1-oxyl-2,2,5,5-tetramethyl pyrrolidine, 1-oxyl-2,2,5,5-tetramethyl-3-carboxylpyrrolidine (also known as 3-carboxy PROXYL), aluminum-N-nitrosophenylhydroxylamine, diethylhydroxylamine. Further suitable N-oxyl compounds are oximes, such as acetaldoxime, acetone oxime, methyl ethyl ketoxime, salicylaldoxime, benzoxime, glyoxime, dimethylglyoxime, acetone-O-(benzyloxycarbonyl)oxime, or indoline nitroxide radicals, such as 2,3-dihydro-2,2-diphenyl-3-(phenylimino)-1H-indole-1-oxylnitroxide, or β-phosphorylated nitroxide radicals, such as 1-(diethoxyphosphinyl)-2,2-dimethylpropyl-1,1-dimethylethyl nitroxide, and the like.

The reactive resin composition may also contain inorganic aggregates such as fillers and/or other additives.

Common fillers, advantageously mineral or mineral-like fillers, such as quartz, glass, sand, silica sand, silica flour, porcelain, corundum, ceramic, talc, silica (e.g. pyrogenic silica), silicates, clay, titanium dioxide, chalk, heavy spar, feldspar, basalt, aluminum hydroxide, granite or sandstone, polymeric fillers such as thermosetting plastics, hydraulically curable fillers, such as gypsum, burnt lime or cement (e.g. high-alumina cement or Portland cement), metals, such as aluminum, carbon black, furthermore wood, mineral or organic fibers, or the like, or mixtures of two or more thereof, which may be added in granular form or in the form of molded articles, may be used as fillers. The fillers may be used in any desired form, for example as powder or flour, or as molded articles, e.g. in the form of cylinders, rings, spheres, plates, rods, saddles or crystals, or further in fiber form (fibrillary fillers), and the corresponding base particles advantageously have a maximum diameter of 10 mm. However, the globular, inert substances (spherical form) act preferably and with much stronger reinforcing effect.

Conceivable additives are thixotropic agents, such as, if applicable, organically post-treated pyrogenic silica, bentonites, alkyl and methyl celluloses, castor oil derivatives or the like, plasticizers, such as phthalic or sebacic acid esters, stabilizers, antistatic agents, thickeners, flexibilizers, curing catalysts, rheology additives, wetting agents, coloring additives, such as dyes or in particular pigments, for example for imparting different colors to the components for better monitoring of their intermixing, or the like, or mixtures of two or more thereof. Even non-reactive diluents (solvents) may be present, such as lower alkyl ketones, e.g. acetone, di-(lower alkyl) lower alkanoylamides, such as dimethyl acetamide, lower alkylbenzenes, such as xylenes or toluene, phthalic acid esters or paraffins, water or glycols. Furthermore, metal scavengers in the form of surface-modified pyrogenic silicas may be contained in the reactive resin composition.

In this regard, reference is made to the publications WO 02/079341 A1 and WO 02/079293 A1 as well as WO 2011/128061 A1, the contents of which are included in the present Application.

In order to provide a system that is stable in storage, it is necessary to separate the Cu(0) or the inorganic Cu(I) compound and the nitrogen-containing ligands as well as the initiator if applicable from one another in a way that inhibits the reaction. This is usually achieved by storing the Cu(0) or the inorganic Cu(I) compound in a first component and the ligand and if applicable the initiator in a second component kept separate from the first component.

Accordingly, further subject matter of the invention is a two-component or multicomponent system that contains the described reactive resin composition.

In one embodiment of the invention, the components of the reactive resin composition are physically disposed in such a way that the Cu(0) or the inorganic Cu(I) compound and the nitrogen-containing ligand as well as the initiator are kept separated from one another, i.e. in respective components disposed separate from one another. In this way, formation of the reactive species, namely the reactive copper complex, is prevented from already starting during storage, as is therefore polymerization of the radical-polymerizable compound.

Furthermore, it is preferable to separate the initiator also from the Cu(0) or the inorganic Cu(I) compound, since it cannot be ruled out that gradual initiation could be caused. This would lead to premature at least partial polymerization (gelling) of the radical-polymerizable compound and thus to reduced stability during storage. Furthermore, this would have a negative influence on the preadjusted gel time of the composition, which would be manifested in a drift of gel time.

This initiator may be stored together with the nitrogen-containing ligands in one component, as in a two-component system, or as an independent component, as in a three-component system.

A preferred embodiment relates to a two-component system that contains a reactive resin composition comprising a radical-polymerizable compound, an α-halocarboxylic acid ester, a nitrogen-containing ligand, Cu(0) or an inorganic Cu(I) compound, an accelerator, an inhibitor, if applicable at least one reactive diluent and if applicable inorganic aggregates. In this case, the Cu(0) or the inorganic Cu(I) compound, the accelerator and the inhibitor are contained in a first component, the A component, and the α-halocarboxylic acid ester and the nitrogen-containing ligand are contained in a second component, the B component, in which case the two components are kept apart from one another in order to prevent the ingredients from reacting with one another before they are mixed. The radical-polymerizable component, the reactive diluent and the inorganic aggregates are distributed among the A and B components.

The reactive resin composition may be contained in a cartridge, a container, a capsule or a foil bag, which comprises two or more chambers, which are separate from one another and in which the Cu(0) or the inorganic Cu(I) compound and the nitrogen-containing ligand are kept separate from one another in a way that prevents reaction.

The inventive reactive resin composition is used most of all in the construction sector, for example for repair of concrete, as polymer concrete, as coating mass on a plastic basis or as cold-curing road marking. They are particularly suitable for chemical fastening of anchoring elements, such as anchors, rebar, bolts and the like, use in drilled holes, especially in drilled holes in various substrates, especially mineral substrates such as those on the basis of concrete, cellular concrete, brickwork, sand-like brick, sandstone, natural stone and the like.

Further subject matter of the invention is the use of the reactive resin composition as a binding agent, especially for fastening of anchoring agents in drilled holes in various substrates and for bonding in construction.

The present invention also relates to the use of the above-defined reactive resin mortar composition for building purposes, comprising the curing of the composition by mixing of the Cu(0) or of the inorganic Cu(I) compound with the nitrogen-containing ligand and the initiator.

More preferably, the inventive reactive resin composition is used for fastening of threaded anchor rods, rebars, threaded sleeves and bolts in drilled holes in various substrates, comprising: mixing of the Cu(0) or of the organic Cu(I) compound with the nitrogen-containing ligand and the initiator, introducing the mixture into the drilled hole, insertion of the threaded anchor rods, rebars, threaded sleeves and bolts into the mixture in the drilled hole and curing of the mixture.

The invention will be explained in more detail on the basis of a series of examples and comparison examples. All examples support the scope of the claims. Nevertheless, the invention is not restricted to the specific embodiments shown in the examples.

EXEMPLARY EMBODIMENTS

The following ingredients were used for manufacture of the following exemplary formulations.

| Abbreviation | Designation |
|---|---|
| UMA-1 | Urethane methacrylate prepolymer, MW approx. 1000 g/mol, dissolved to 33 wt % in a 1:1 (w/w) mixture of HPMA and 1,4-BDDMA (hydroxypropyl methacrylate and 1,4-butanediol dimethacrylate) |
| Cu powder | Copper powder, particle size <75 µm |
| $Cu_2O$ | Copper(I) oxide, particle size <5 µm |
| MeHQ | Methylhydroquinone |
| Tempol | 4-Hydroxy-2,2,6,6-tetramethylpiperidine-1-oxyl |
| TS-720 | Pyrogenic silica Cab-O-Sil TS-720 |
| F32 | Silica sand F31 |
| W12 | Silica flour Millisil W12 |
| bipy | 2,2'-Bipyridyl |
| TMEDA | N,N,N',N'-Tetramethylethylenediamine |
| HMTETA | 1,1,4,7,10,10-Hexamethyltriethylenetetramine |
| TDMAEA | Tris-(Dimethylaminoethyl)amine |
| PMDETA | N,N,N',N'',N''-Pentamethyldiethylenetriamine |
| BiBEE | α-Bromo-iso-butyric acid ethyl ester |

Preparation of the Compositions

Inorganically filled two-component systems with the compositions shown in Tables 1 to 5 were prepared and various properties of the masses obtained were investigated.

Firstly the two components A and B are prepared separately, by first preparing homogeneous mixtures from the respective ingredients of the A and B components shown in Tables 1 to 5, wherein pasty, readily flowing components are obtained. Curing is started by thorough mixing of the two components A and B, wherein the components were mixed in the volume ratio A:B=3:1.

EXAMPLES 1 AND 2

In order to appraise the applicability of the initiator system to cold-curing methacrylate esters for chemical reactive resin mortars, the reactive resin compositions listed in Table 1 were prepared, wherein Cu(0) was used as catalyst in Example 1 and $Cu_2O$ was used in Example 2, and the reactivity of the reactive resin composition was determined on the basis of the gel time at +25° C. and of the exothermicity.

Determination of the Gel Time and of the Exothermicity

The gel time of the compositions is determined with a commercial apparatus (GELNORM®-Gel Timer) at a temperature of 25° C. All ingredients are mixed for this purpose. This mixture is filled into a test tube up to a height of 4 cm below the rim, while the test tube was maintained at a temperature of 25° C. (DIN 16945, DIN EN ISO 9396). A glass rod or a spindle is moved up and down in the resin at 10 strokes per minute. The gel time corresponds to the moment at which the test tube is lifted by the oscillating rod. Additional tests have shown that the degree of curing at the gel point (measured by differential scanning calorimetry (DSC)) is constant within the measurement accuracy.

The heat generation of the sample is plotted against time. The evaluation is based on DIN 16945. The gel time is the time at which a temperature rise of 10 K is attained, in the present case from 25° C. to 35° C.

The reactivity measurement (exothermicity) is based on DIN 16945.

TABLE 1

| | Example[a] | | | |
|---|---|---|---|---|
| | 1 | | 2 | |
| A component | | | | |
| Methacrylate resin | UMA-1 | 39.8% | UMA-1 | 39.8% |
| Catalyst | Cu | 0.49% | Cu$_2$O | 0.49% |
| Thickener | TS-720 | 2.50% | TS-720 | 2.50% |
| Filler | F32 | 38.5% | F32 | 38.5% |
| | W12 | 18.5% | W12 | 18.5% |
| B component | | | | |
| Methacrylate resin | UMA-1 | 38.6% | UMA-1 | 38.6% |
| Ligand | PMDETA | 0.93% | PMDETA | 0.93% |
| Initiator | BiBEE | 0.94% | BiBEE | 0.94% |
| Thickener | TS-720 | 2.50% | TS-720 | 2.50% |
| Filler | F32 | 38.5% | F32 | 38.5% |
| | W12 | 18.5% | W12 | 18.5% |
| Reactivity | | | | |
| Gel time 25° C. | | 26 min | | no curing[b] |
| Exothermicity | | 64° C. | | — |

[a] All values in wt %
[b] Measurement stopped after 2.5 h

EXAMPLES 3 TO 12

In order to appraise the influence of an accelerator, the reactive resin compositions listed in Table 2 were prepared, wherein Cu(0) was used as catalyst in Examples 3 to 7 and Cu$_2$O as catalyst in Examples 8 to 12, methylhydroquinone was used respectively as accelerator in different concentrations and the reactivity of the reactive resin composition was determined on the basis of the gel time at +25° C. and of the exothermicity in accordance with the above description.

These examples show that the proportion of methylhydroquinone has a substantial influence on the reactivity and that polymerization without MeHQ takes place more slowly and more poorly (exothermicity much lower). Furthermore, it is apparent that Cu(0) is activated much better than Cu$_2$O.

TABLE 2

| | Example[a] 1, 3-7 | | Example 2, 8-12 | |
|---|---|---|---|---|
| A component | | | | |
| Methacrylate resin | UMA-1 | 39.8% | UMA-1 | 39.8% |
| Co-initiator | Cu | 0.49% | Cu$_2$O | 0.49% |
| Accelerator | MeHQ | Variable | MeHQ | Variable |
| Thickener | TS-720 | 2.50% | TS-720 | 2.50% |
| Filler | F32 | 38.5% | F32 | 38.5% |
| | W12 | 18.5% | W12 | 18.5% |
| B component | | | | |
| Methacrylate resin | UMA-1 | 38.6% | UMA-1 | 38.6% |
| Ligand | PMDETA | 0.93% | PMDETA | 0.93% |
| Initiator | BiBEE | 0.94% | BiBEE | 0.94% |
| Thickener | TS-720 | 2.50% | TS-720 | 2.50% |
| Filler | F32 | 38.5% | F32 | 38.5% |
| | W12 | 18.5% | W12 | 18.5% |
| Reactivity | | | | |
| Example | | | Example | |
| 1 | MeHQ/g UMA | 0 mmol | 2 | 0 mmol |
| | Gel time 25° C. | 48 min | | no curing[b] |
| | Exothermicity | 55° C. | | |
| 3 | MeHQ/g UMA | 0.01 mmol | 8 | 0.01 mmol |
| | Gel time 25° C. | 16 min | | 18.5 min |
| | Exothermicity | 65° C. | | 85° C. |
| 4 | MeHQ/g UMA | 0.015 mmol | 9 | 0.015 mmol |
| | Gel time 25° C. | 12.6 min | | 15.7 min |
| | Exothermicity | 77° C. | | 90° C. |
| 5 | MeHQ/g UMA | 0.02 mmol | 10 | 0.02 mmol |
| | Gel time 25° C. | 9 min | | 13.9 min |
| | Exothermicity | 88° C. | | 88° C. |
| 6 | MeHQ/g UMA | 0.04 mmol | 11 | 0.04 mmol |
| | Gel time 25° C. | 4.6 min | | 13.1 min |
| | Exothermicity | 88° C. | | 87° C. |
| 7 | MeHQ/g UMA | 0.06 mmol | 12 | 0.06 mmol |
| | Gel time 25° C. | 3.8 min | | 11.0 min |
| | Exothermicity | 86° C. | | 87° C. |

[a] All values in wt %;
[b] Measurement stopped after 2.5 h

EXAMPLES 13 TO 16

In order to appraise the different reactivity of the Cu(I) chalcogens, the reactive resin compositions listed in Table 3 were prepared and the reactivity of the reactive resin composition was determined on the basis of the gel time at +25° C. and of the exothermicity in accordance with the above description.

The examples show that all Cu(I) compounds used act as catalysts, with the following order of reactivity (with respect to the gel time): Cu$_2$Te>Cu$_2$Se>Cu$_2$O>Cu$_2$S.

TABLE 3

| | Example[a] | | | | | | | |
|---|---|---|---|---|---|---|---|---|
| | 13 | | 14 | | 15 | | 16 | |
| A component | | | | | | | | |
| Methacrylate resin | UMA-1 | 38.3% | UMA-1 | 38.8% | UMA-1 | 38.9% | UMA-1 | 38.8% |
| Catalyst | Cu$_2$Te | 1.98% | Cu$_2$Se | 0.81% | Cu$_2$S | 0.57% | Cu$_2$O | 0.56% |
| Accelerator | MeHQ | 0.20% | MeHQ | 0.20% | MeHQ | 0.20% | MeHQ | 0.20% |
| Thickener | TS-720 | 2.50% | TS-720 | 2.53% | TS-720 | 2.54% | TS-720 | 2.54% |
| Filler | F32 | 38.5% | F32 | 39.0% | F32 | 39.1% | F32 | 39.1% |
| | W12 | 18.5% | W12 | 18.7% | W12 | 18.8% | W12 | 18.8% |
| B component | | | | | | | | |
| Methacrylate resin | UMA-1 | 38.6% | UMA-1 | 38.6% | UMA-1 | 38.6% | UMA-1 | 38.6% |
| Ligand | PMDETA | 0.93% | PMDETA | 0.93% | PMDETA | 0.93% | PMDETA | 0.93% |

TABLE 3-continued

| | Example[a)] | | | | | | | |
|---|---|---|---|---|---|---|---|---|
| | 13 | | 14 | | 15 | | 16 | |
| Initiator | BiBEE | 0.94% | BiBEE | 0.94% | BiBEE | 0.94% | BiBEE | 0.94% |
| Thickener | TS-720 | 2.5% | TS-720 | 2.5% | TS-720 | 2.5% | TS-720 | 2.5% |
| Filler | F32 | 38.5% | F32 | 38.5% | F32 | 38.5% | F32 | 38.5% |
| | W12 | 18.5% | W12 | 18.5% | W12 | 18.5% | W12 | 18.5% |
| Reactivity | | | | | | | | |
| Gel time 25° C. | 0.8 min | | 4.7 min | | 18.0 min | | 6.0 min | |
| Exothermicity | 100° C. | | 90° C. | | 55° C. | | 95° C. | |

[a)]All data in wt %

EXAMPLES 17 TO 19

In order to appraise the different reactivity of copper powder with different specific surface areas, the reactive resin compositions listed in Table 4 were prepared and the reactivity of the reactive resin composition was determined on the basis of the gel time at +25° C. and of the exothermicity in accordance with the above description.

These examples show that the copper powder must have a sufficiently large specific surface area in order to achieve good reactivity—the "Cu 400μ" copper powder, which exists in relatively coarse, sand-like form, leads to rather weak exothermicity after a very long time, thus suggesting only inadequate initiation.

TABLE 4

| | Example[a)] | | | | | |
|---|---|---|---|---|---|---|
| | 17 | | 18 | | 19 | |
| A component | | | | | | |
| Methacrylate resin | UMA-1 | 39.9% | UMA-1 | 39.9% | UMA-1 | 39.9% |
| Catalyst | Cu <10μ | 0.49% | CU <75μ | 0.49% | Cu 400μ | 0.49% |
| Accelerator | MeHQ | 0.20% | MeHQ | 0.20% | MeHQ | 0.20% |
| Thickener | TS-720 | 2.50% | TS-720 | 2.50% | TS-720 | 2.50% |
| Filler | F32 | 38.5% | F32 | 38.5% | F32 | 38.5% |
| | W12 | 18.5% | W12 | 18.5% | W12 | 18.5% |
| B component | | | | | | |
| Methacrylate resin | UMA-1 | 38.6% | UMA-1 | 38.6% | UMA-1 | 38.6% |
| Ligand | PMDETA | 0.93% | PMDETA | 0.93% | PMDETA | 0.93% |
| Initiator | BiBEE | 0.94% | BiBEE | 0.94% | BiBEE | 0.94% |
| Thickener | TS-720 | 2.51% | TS-720 | 2.51% | TS-720 | 2.51% |
| Filler | F32 | 38.5% | F32 | 38.5% | F32 | 38.5% |
| | W12 | 18.5% | W12 | 18.5% | W12 | 18.5% |
| Reactivity | | | | | | |
| Gel time 25° C. | 6.3 min | | 3.5 min | | 45 min | |
| Exothermicity | 76° C. | | 88° C. | | 27° C. | |

[a)]All data in wt %

EXAMPLES 20 TO 24

In order to appraise the different reactivity of various nitrogen-containing ligands, the reactive resin compositions listed in Table 5 were prepared and the reactivity of the reactive resin composition was determined on the basis of the gel time at +25° C. and of the exothermicity in accordance with the above description.

The examples show that, in principle, various nitrogen-containing ligands are suitable. For equal molar proportions, the following order of reactivity is obtained: TDMAEA>HMTETA>PMDETA>bipy>TMEDA.

TABLE 5

| | Example[a)] | | | | | | | | | |
|---|---|---|---|---|---|---|---|---|---|---|
| | 20 | | 21 | | 22 | | 23 | | 24 | |
| A component | | | | | | | | | | |
| Methacrylate resin | UMA-1 | 38.8% | UMA-1 | 39.8% | UMA-1 | 39.8% | UMA-1 | 39.8% | UMA-1 | 39.8% |
| Co-initiator | $Cu_2O$ | 0.56% | $Cu_2O$ | 0.49% | $Cu_2O$ | 0.49% | $Cu_2O$ | 0.49% | $Cu_2O$ | 0.49% |

TABLE 5-continued

| | Example[a] | | | | | | | | | |
|---|---|---|---|---|---|---|---|---|---|---|
| | 20 | | 21 | | 22 | | 23 | | 24 | |
| Accelerator | MeHQ | 0.20% | MeHQ | 0.20% | MeHQ | 0.20% | MeHQ | 0.20% | MeHQ | 0.20% |
| Thickener | TS-720 | 2.54% | TS-720 | 2.50% | TS-720 | 2.50% | TS-720 | 2.50% | TS-720 | 2.50% |
| Filler | F32 | 39.1% | F32 | 38.5% | F32 | 38.5% | F32 | 38.5% | F32 | 38.5% |
| | W12 | 18.8% | W12 | 18.5% | W12 | 18.5% | W12 | 18.5% | W12 | 18.5% |
| B component | | | | | | | | | | |
| Methacrylate resin | UMA-1 | 38.6% | UMA-1 | 38.7% | UMA-1 | 38.8% | UMA-1 | 38.5% | UMA-1 | 38.5% |
| Ligand | PMDETA | 0.93% | Bipy | 0.84% | TMEDA | 0.62% | HMTETA | 1.23% | TDMAEA | 1.23% |
| Initiator | BiBEE | 0.94% | BiBEE | 0.94% | BiBEE | 0.94% | BiBEE | 0.93% | BiBEE | 0.93% |
| Thickener | TS-720 | 2.5% | TS-720 | 2.51% | TS-720 | 2.52% | TS-720 | 2.50% | TS-720 | 2.50% |
| Filler | F32 | 38.5% | F32 | 38.5% | F32 | 38.6% | F32 | 38.4% | F32 | 38.4% |
| | W12 | 18.5% | W12 | 18.5% | W12 | 18.5% | W12 | 18.4% | W12 | 18.5% |
| Reactivity | | | | | | | | | | |
| Gel time 25° C. | 6.0 min | | 15.5 min | | 15.1 min | | 4.2 min | | 3.4 min | |
| Exothermicity | 95° C. | | 45° C. | | 32° C. | | 88° C. | | 93° C. | |

[a]All data in wt %

EXAMPLES 25 AND 26

In order to appraise the influence of the nitrogen-containing ligand, the reactive resin compositions listed in Table 6 were prepared and the reactivity of the reactive resin composition was determined on the basis of the gel time at +25° C. and of the exothermicity in accordance with the above description. From Table 6 it is apparent that a nitrogen-containing ligand is absolutely necessary for the composition to cure.

TABLE 6

| | Example[a] | | | |
|---|---|---|---|---|
| | 25 | | 26 | |
| A component | | | | |
| Methacrylate resin | UMA-1 | 39.8% | UMA-1 | 39.8% |
| Co-initiator | Cu | 0.49% | Cu$_2$O | 0.49% |
| Accelerator Inhibitor | MeHQ | 0.06 mmol | MeHQ | 0.06 mmol |
| Thickener | TS-720 | 2.50% | TS-720 | 2.50% |
| Filler | F32 | 38.5% | F32 | 38.5% |
| | W12 | 18.5% | W12 | 18.5% |
| B component | | | | |
| Methacrylate resin | UMA-1 | 38.6% | UMA-1 | 38.6% |
| Ligand | PMDETA | Variable | PMDETA | Variable |
| Initiator | BiBEE | 0.94% | BiBEE | 0.94% |
| Thickener | TS-720 | 2.50% | TS-720 | 2.50% |
| Filler | F32 | 38.5% | F32 | 38.5% |
| | W12 | 18.5% | W12 | 18.5% |
| Reactivity | | | | |
| 0% PMDETA | | | | |
| Gel time 25° C. | 0 mmol | | 0 mmol | |
| Exothermicity | no curing[b] | | no curing[b] | |
| | — | | — | |
| 0.93% PMDETA | 0.01 mmol | | 0.01 mmol | |
| Gel time 25° C. | 10.2 min | | 10.0 min | |
| Exothermicity | 83° C. | | 85° C. | |

[a]All values in wt %
[b]Measurement stopped after 3 h

EXAMPLES 27 TO 31

In order to appraise the different reactivity of various nitrogen-containing ligands, the reactive resin compositions listed in Table 7 were prepared and the reactivity of the reactive resin composition was determined on the basis of the gel time at +25° C. and of the exothermicity in accordance with the above description.

These examples show that the reactivity can be adjusted by variation of the concentration of the initiator system. Furthermore, the examples show that the gel time can be adjusted by means of a polymerization inhibitor.

Furthermore, it was shown on the basis of these examples that the inventive reactive resin compositions are suitable as binding agents for reactive resin mortars for chemical fastening.

Determination of the Pull-Out Resistance

Respectively 3 M12×72 anchor rods were inserted into dry and cleaned drilled holes of 14 mm diameter in C20/25 concrete and after 24 hours of curing were pulled out to failure (central tension), and the following failure loads were determined at the test temperatures indicated in Table 7 (mean values of 3 measurements).

On the basis of Examples 27 to 31, it is apparent that, with the inorganically filled reactive resin compositions, polymerization of methacrylates, which can be delayed with an inhibitor, is achieved at room temperature and, even after a long open time (gel time approx. 20 minutes), still yields good polymerization (peak temperature approx. 90° C.) as well as leads to good mechanical properties at room temperature and at elevated temperatures. This suggests that it is possible, with the inventive reactive resin compositions, to adjust the gel time selectively and to adapt it to the respective needs of application.

TABLE 7

| | Example[a] | | | | | | | | | |
|---|---|---|---|---|---|---|---|---|---|---|
| | 27 | | 28 | | 29 | | 30 | | 31 | |
| A component | | | | | | | | | | |
| Methacrylate resin | UMA-1 | 39.8% | UMA-1 | 39.8% | UMA-1 | 39.8% | UMA-1 | 39.8% | UMA-1 | 39.8% |
| Co-initiator | Cu-pulver | 0.49% | Cu-pulver | 0.49% | Cu-pulver | 0.49% | $Cu_2O$ | 0.49% | $Cu_2O$ | 0.49% |
| Accelerator | MeHQ | 0.20% | MeHQ | 0.30% | MeHQ | 0.30% | MeHQ | 0.30% | MeHQ | 0.30% |
| Inhibitor | | | Tempol | 0.042% | Tempol | 0.010% | | | Tempol | 0.01% |
| Thickener | TS-720 | 2.50% | TS-720 | 2.5% | TS-720 | 2.5% | TS-720 | 2.5% | TS-720 | 2.50% |
| Filler | F32 | 38.5% | F32 | 38.5% | F32 | 38.5% | F32 | 38.4% | F32 | 38.4% |
| | W12 | 18.5% | W12 | 18.5% | W12 | 18.5% | W12 | 18.5% | W12 | 18.5% |
| B component | | | | | | | | | | |
| Methacrylate resin | UMA-1 | 38.6% | UMA-1 | 38.6% | UMA-1 | 38.6% | UMA-1 | 38.6% | UMA-1 | 38.6% |
| Ligand | PMDETA | 0.93% | PMDETA | 0.93% | PMDETA | 0.93% | PMDETA | 0.93% | PMDETA | 0.93% |
| Initiator | BiBEE | 0.94% | BiBEE | 0.94% | BiBEE | 0.94% | BiBEE | 0.94% | BiBEE | 0.94% |
| Thickener | TS-720 | 2.5% | TS-720 | 2.5% | TS-720 | 2.5% | TS-720 | 2.5% | TS-720 | 2.5% |
| Filler | F32 | 38.5% | F32 | 38.5% | F32 | 38.5% | F32 | 38.5% | F32 | 38.5% |
| | W12 | 18.5% | W12 | 18.5% | W12 | 18.5% | W12 | 18.5% | W12 | 18.5% |
| Reactivity | | | | | | | | | | |
| Gel time 25° C. | 1.5 min | | 12.4 min | | 8.4 min | | 10.1 min | | 19.5 min | |
| Exothermicity | 90° C. | | 90° C. | | 90° C. | | 86° C. | | 89° C. | |
| Failure loads | | | | | | | | | | |
| −5° C. | 1.7 N/mm² | | 11.6 N/mm² | | 7.0 N/mm² | | No curing | | Not cured | |
| +5° C. | 3.4 N/mm² | | 13.0 N/mm² | | 8.1 N/mm² | | 5.9 N/mm² | | 6.0 N/mm² | |
| +20° C. | 7.0 N/mm² | | 14.2 N/mm² | | 10.1 N/mm² | | 9.4 N/mm² | | 8.0 N/mm² | |
| +40° C. | 12.8 N/mm² | | 16.8 N/mm² | | 14.5 N/mm² | | 15.4 N/mm² | | 15.5 N/mm² | |

[a] All data in wt %

The invention claimed is:

1. A reactive resin composition, comprising:
a resin component, which comprises a radical-polymerizable compound, and an initiator system, which comprises an α-halocarboxylic acid ester and a catalyst system,
wherein the catalyst system comprises at least one nitrogen-containing ligand and Cu(0) or an inorganic Cu(I) compound
wherein said initiator system further comprises an accelerator which is a phenol or a phenol derivative.

2. The reactive resin composition according to claim 1, wherein the α-halocarboxylic acid ester is selected from the group consisting of compounds of the general formula (I)

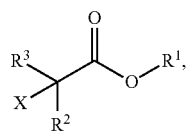

(I)

in which
X denotes chlorine, bromine or iodine;
$R^1$ is a straight-chain or branched $C_1$-$C_{20}$ alkyl group, optionally substituted, an aryl group; or
a radical of an acylated, branched, trihydric alcohol, a radical of a completely or partly acylated, linear or branched tetrahydric alcohol, a radical of a completely or partly acylated, linear pentahydric or hexahydric alcohol, a radical of a completely or partly acylated, linear or cyclic $C_4$-$C_6$ aldose or $C_4$-$C_6$ ketose or a radical of a completely or partly acylated disaccharide, or isomers of these compounds;

$R^2$ and $R^3$, independently of one another, is hydrogen, a $C_1$-$C_{20}$ alkyl group, a $C_3$-$C_8$ cycloalkyl group, $C_2$-$C_{20}$ alkenyl or alkynyl group, oxiranyl group, glycidyl group, aryl group, heterocyclyl group, aralkyl group or aralkenyl group.

3. The reactive resin composition according to claim 2, wherein the α-halocarboxylic acid ester is a $C_1$-$C_6$ alkyl ester of an α-halo-$C_1$-$C_6$ carboxylic acid.

4. The reactive resin composition according to claim 3, wherein the α-halo-$C_1$-$C_6$ carboxylic acid is an α-bromo-$C_1$-$C_6$ carboxylic acid.

5. The reactive resin composition according to claim 1, wherein the nitrogen-containing ligand contains two or more nitrogen atoms and is able to form a chelate complex with copper(I).

6. The reactive resin composition according to claim 5, wherein the nitrogen-containing ligand is selected from the group consisting of i) amino compounds with at least two primary, secondary and/or tertiary amino groups and ii) amino compounds with at least one heterocyclic nitrogen atom.

7. The reactive resin composition according to claim 5, wherein the nitrogen-containing ligand is present in excess relative to the Cu(0) or an inorganic Cu(I) compound.

8. The reactive resin composition according to claim 1, wherein the inorganic Cu(I) compound is a Cu(I) compound with elements of Group VI.

9. The reactive resin composition according to claim 8, wherein the inorganic Cu(I) compound is at least one selected from the group consisting of $Cu_2O$, $Cu_2S$, $Cu_2Se$ and $Cu_2Te$.

10. The reactive resin composition according to claim 1, wherein the radical-polymerizable compound is an unsaturated polyester resin, a vinyl ester resin and/or a vinyl ester-urethane resin.

11. The reactive resin composition according to claim 1, wherein the radical-polymerizable compound is a (meth)acrylate-functionalized resin and the α-halocarboxylic acid ester is an α-halocarboxylic acid ester of isobutanoic acid or propanoic acid.

12. The reactive resin composition according to claim 1, further comprising a non-phenolic inhibitor.

13. The reactive resin composition according to claim 12, wherein the non-phenolic inhibitor is a stable N-oxyl radical.

14. The reactive resin composition according to claim 1, wherein the resin component further comprises at least one reactive diluent.

15. The reactive resin composition according to claim 1, further comprising an inorganic aggregate.

16. The reactive resin composition according to claim 15, wherein the inorganic aggregate is an additive and/or a filler.

17. A two-component or multicomponent system, comprising:
the reactive resin composition according to claim 1, wherein the nitrogen-containing ligand and the Cu(0) or the inorganic Cu(I) compound are stored separately from one another in a way that inhibits reaction.

18. The two-component system according to claim 17, wherein
the Cu(0) or the inorganic Cu(I) compound and optionally an accelerator are contained in a first component, and
the nitrogen-containing ligand and the initiator are contained in a second component,
the radical-polymerizable compound and optionally the inhibitor are distributed among the two components, wherein the two components are kept separate from one another in a way that inhibits reaction.

19. The two-component system according to claim 18, wherein the reactive resin composition further comprises at least one reactive diluent and/or inorganic aggregates, which are contained in one or in both components.

20. A method for anchoring of an anchoring elements in a drilled hole, said method comprising:
applying in said drilled hole the reactive resin composition according to claim 1.

* * * * *